United States Patent [19]
Beauchamp et al.

[11] Patent Number: 5,293,370
[45] Date of Patent: * Mar. 8, 1994

[54] METHOD AND APPARATUS FOR CREATING OPTICAL DISC MASTERS

[75] Inventors: Robert C. Beauchamp, Westminster, Calif.; Jim Norton, Minneola, Kans.; Robert Dobbin; David Loeppky, both of Irvine, Calif.

[73] Assignee: Del Mar Avionics, Irvine, Calif.

[*] Notice: The portion of the term of this patent subsequent to Mar. 24, 2009 has been disclaimed.

[21] Appl. No.: 641,696

[22] Filed: Jan. 16, 1991

[51] Int. Cl.⁵ .............................................. G11B 7/00
[52] U.S. Cl. ............................ 369/109; 369/275.3; 369/77.2
[58] Field of Search ............... 369/275.1, 275.5, 291, 369/77.2, 77.1, 109, 111; 346/135.1, 137, 76 L

[56] References Cited

U.S. PATENT DOCUMENTS

| | | | |
|---|---|---|---|
| 3,565,978 | 2/1971 | Folger et al. | 264/1 |
| 4,074,282 | 2/1978 | Balas | 346/137 |
| 4,264,911 | 12/1981 | Wilkinson | 346/135.1 |
| 4,304,806 | 12/1981 | Anderson et al. | 428/65 |
| 4,308,545 | 12/1981 | Lehureau et al. | 346/135.1 |
| 4,327,830 | 5/1982 | Patel et al. | 369/292 |
| 4,331,966 | 5/1982 | Moe | 346/137 |
| 4,365,258 | 12/1982 | Geyer et al. | 346/135.1 |
| 4,385,303 | 5/1983 | Akahim | 346/137 |
| 4,417,331 | 11/1983 | Takaoka | 369/111 |
| 4,470,054 | 9/1984 | Wrobel | 346/137 |
| 4,482,903 | 11/1984 | Affolter | 346/137 |
| 4,510,508 | 4/1985 | Janssen | 369/275.5 |
| 4,535,434 | 8/1985 | Kishi | 369/275.5 |
| 4,536,869 | 8/1985 | Chandler et al. | 346/135.1 |
| 4,539,573 | 9/1985 | Marchant et al. | 346/135.1 |
| 4,556,968 | 12/1985 | Pelkey et al. | 369/287 |
| 4,561,086 | 12/1985 | Geyer | 369/275.5 |
| 4,565,772 | 1/1986 | Takeoka et al. | 369/275.1 |
| 4,744,074 | 5/1988 | Imanaka | 369/278 |
| 4,764,331 | 8/1988 | Tokuhara | 264/328/17 |
| 4,790,893 | 12/1988 | Watkins | 156/232 |
| 4,802,160 | 1/1989 | Yamado et al. | 369/284 |
| 4,969,143 | 11/1990 | Ogino | 369/275.5 |
| 4,984,232 | 1/1991 | Utsumi et al. | 346/137 |
| 5,020,048 | 5/1991 | Arai et al. | 369/291 |
| 5,099,469 | 3/1992 | Dobbin et al. | 369/58 |

FOREIGN PATENT DOCUMENTS

| | | | |
|---|---|---|---|
| 6180633 | 4/1986 | Japan | 369/275.1 |
| 61-246943 | 11/1986 | Japan | 369/275.1 |
| 62-31047 | 2/1987 | Japan | 369/275.1 |
| 1-116978 | 5/1989 | Japan | 369/275.1 |
| 91033894 | 12/1990 | Japan | 369/275.1 |

Primary Examiner—Jeffery Brier
Assistant Examiner—Thai Tran
Attorney, Agent, or Firm—James D. Leimbach

[57] ABSTRACT

Method and apparatus for a portable clean environment used for recording optical disc masters by enclosing a light sensitive optical disc in a container that prevents ambient contamination from destroying the pristine environment necessary to create optical disc masters. A transparent optical disc, having an optically active lamina on at least one surface of the transparent optical disc, is enclosed in a dish shaped container that is generally free of particulate larger than 0.2 microns, the enclosure assembly effectively preserving a class 10 cleanroom environment. The dish shaped enclosure isolates the surface of the optical disc used to record data from contamination due to ambient conditions while exposing the nonwriting surface of the optical disc to enable laser writing. A foil seal protects the exposed nonwriting surface of the optical disc from ambient contamination during storage and until recording is desired. Once recording is desired, the foil seal is removed, the entire assembly is placed on the spindle of a turntable, and the transparent optical disc allows laser light to pass through the optical disc and focus on the optically active lamina to form pits within the optically active lamina by either ablating the lamina or by consuming the lamina. The optical disc is then removed from the cover in a cleanroom where electroforming is done on the optical disc to create a disc master.

17 Claims, 3 Drawing Sheets

METHOD AND APPARATUS FOR CREATING OPTICAL DISC MASTERS

RELATED PATENT SPECIFICATION

This application is related to companion patent application entitled "Process for Manufacturing an Optical Disc Master," Ser. No. 07/482,033, filed Oct. 16, 1990, now U.S. Pat. No. 5,099,469 having the same assignee as the present invention. Any information contained in said related application that is essential to the understanding of the present invention has been included in the detailed description to the present invention.

BACKGROUND OF THE INVENTION

1. Field of the Invention

This invention relates generally to the art of recording optical disc masters, and more particularly to a method and apparatus for a enclosing a pregrooved, transparent optical disc in a portable container that effectively maintains a clean room environment, which is adaptable to serve as the site mounting for optical discs and optical disc masters during precision recording thereon. When the packaged disc assembly is mounted on a spindle for recording, the process of recording by laser causes effective ablating or consumption of thin optically active layers on the optical disc surfaces to form pits. The optically modified surface can then be electroformed to form a disc master.

2. Description of the Prior Art

Optical disc masters are articles from which all prerecorded mass produced consumer optical discs are subsequently molded. Current methods of producing optical disc masters employ highly stable precision turntable apparatus operating in a cleanroom environment. One currently used method is the photoresist technique commonly used in the semiconductor industry. This method would spin coat a lamina of photoresist material upon a very thick, smooth, polished circular plate of glass. A data modulated laser is set immediately above the plate by means of a complex translational mechanism that enables the laser to move outward from the center of the glass plate while rotating the glass plate on a turntable and concomitantly radiating the surface of the material on the plate. This results in a spiral track being created in the photoresist material by the laser. Pits are created by exposure to the data modulated laser along the spiral path. This process requires that the entire equipment and operation be performed in what is typically called a cleanroom environment in which the laser path is unobstructed and the photoresist material remains pristine and uncontaminated.

Currently, there are variations in photoresist mastering techniques which employ the turntable and spiral track system described above. By using ablative surfaces rather than photoresist material on the circular glass plates, lasers can ablate the optical disc surface to cause the desired pits. However, a cleanroom environment is required for all steps in this process. The construction and maintaining of a cleanroom environment is in itself cumbersome and expensive. Also, the present art of manufacturing optical disc masters in cleanrooms is costly. There remains a need for advance beyond the prior art to a manner of mastering optical discs that is simpler and more economical.

SUMMARY OF THE INVENTION

It has been discovered that the recording of optical disc masters is possible in a portable cleanroom environment, wherein a pregrooved transparent plastic flat disc having an optically active lamina deposited on the pregrooved surface, can be enclosed in a dish shaped, optically opaque, plastic container, such that the area enclosed within the container immediately adjacent to the optically active lamina, is isolated from contamination of the ambient surroundings of the dish shaped container. The environment of this isolated area can then be controlled to yield cleanroom conditions, resulting in a portable assembly that can be removed from a cleanroom and easily stored. By direct mounting of the portable assembly on a turntable spindle, a data modulated laser beam can track the pregrooved surface to form pits in the optically active lamina by either ablating or consumming the optically active lamina, thus recording data from the data modulated laser.

Disclosed is a process and associated apparatus used to create and maintain an environment that is sufficiently clean for use in recording optical disc masters which in turn will then be used in the mass production of duplicate optical discs. The optical disc masters, as produced by the process described herein will be used to create plastic molding press tooling which will in turn be used in the mass production of duplicate optical discs. A cleanroom environment is only necessary in producing the unrecorded laser sensitive discs, which are thereafter portable and protected from light and dirt contamination until recording by the sealed recording disc mounting assembly disclosed in the present invention.

It is an object of this invention to create a process for recording of optical disc masters which frees the recording process from having to take place in a cleanroom but instead allows the making of optical disc masters by enclosing an optical disc and having a laser make pits in an optically active lamina on the surface of the optical disc, by either ablating or by consuming the optically active lamina surface, while keeping the lamina surface free of particulate prior to electroforming.

Yet another object of this invention is to create an optical environment in which optical discs having an optically active lamina applied to at least one surface, may have pits formed in the optically active lamina by a focused laser either ablating or consuming the lamina.

Another object of the invention is to provide a protective cover for optical recording discs which is a compact, lightweight and sealed assembly thus simplifying and reducing the cost for storing, shipping and handling of optical recording discs.

Yet another object of the invention is to prevent ambient light from contaminating the optically active lamina on an optical recording disc which would otherwise experience gradual degradation of the optically active lamina surface. Thus an optical recording disc is given a long shelf life before losing its active response to laser light.

It is further the object of this invention to create a process in which optical disc mastering can be accomplished with a vastly reduced cost for capital equipment and can be accomplished in a manner that is significantly less time consuming than the methods that are presently employed.

It is further the object of this invention to create a method of recording optical disc masters in an inexpensive, disposable micro-clean environment, and thus avoid the use of expensive cleanroom technology at the time the recordings for optical disc masters are made.

DETAILED DESCRIPTION OF THE PREFERRED EMBODIMENT

Although the invention pertains to a portable, inexpensive and convenient method and apparatus for maintaining a cleanroom environment, certain specific information pertaining to the structure of the enclosed optical disc is necessary to fully understand and appreciate the nature of the invention. Therefore, a brief description of the specific type of optical disc used with the present invention is included hereinbelow.

Figure 1:
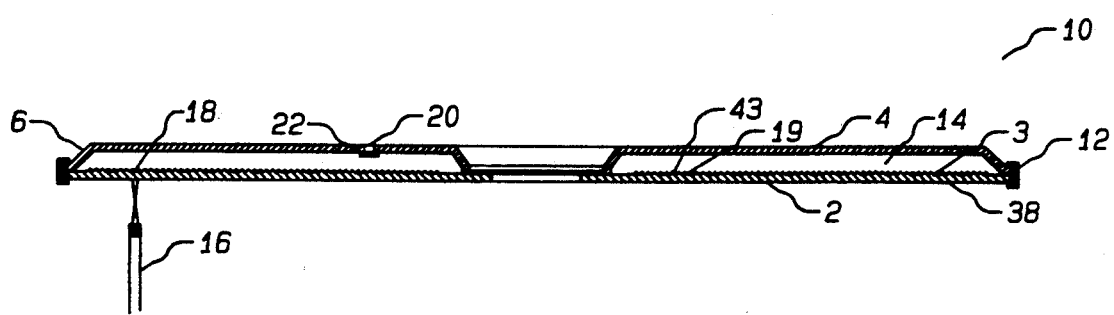
FIG. 1 is a cut away side view of the invention in the condition used for recording.

In the preferred embodiment of the invention, as seen in FIG. 1, a method of writing on a transparent pregrooved optical disc 2 is disclosed. The transparent pregrooved optical disc 2 has an optically active lamina 19 deposited on the writing surface 18 of the optical disc 2. By employing a laser 16 that follows the grooves 3 in the writing surface 18 of the optical disc 2, pits are formed in the writing surface 18 of the optical disc 2 by either ablating or by consuming the optically active lamina 19 to form the pits 42. As can be seen, the optically transparent optical disc 2 is enclosed by the cover 4. The optical disc 2 is made of a polycarbonate material such that the optical disc 2 is transparent having an index of refraction of approximately 1.5. In the preferred embodiment of the invention, optical disc 2 has a spiral tracking groove 3 that is made with exacting groove shape and depth dimensions. The optical disc 2 has an optically active lamina 19 spin coated onto the spiral grooved surface 43. In writing (recording) on the disc, a data modulated laser beam is finely focused on the optically active lamina 19 to form pits 42 by either; a) near total ablation of the optically active lamina 19, or b) by consuming the optically active lamina 19 that is deposited on the writing surface 18 of transparent optical disc 2. During recording, light from the laser actually passes through the nonwriting surface 38 of the optical disc 2 and focuses on the optically active lamina 19 to create the desired pits. After the pits 42 are formed, the optical disc 2 is removed from the cover 4 in a cleanroom to prevent particulate or other forms of contamination from particulate contained with being embedded within the pitted surface of the optical disc 2. It is necessary that particulate within the ambient atmosphere not be allowed to contaminate the pitted surface so that an optical disc stamper can be made therefrom by electroforming.

Still referring to FIG. 1, the pregrooved transparent optical disc 2 is contained within the cover 4 such that a spacial cavity 14 exists above the writing surface 18 of the optical disc 2 which is isolated from ambient conditions. The writing surface 18 of the transparent optical disc 2, that contains the optically active lamina, is thus isolated from the ambient air by the cover 4, resulting in protection from damage caused by physical contact or particulate. The cover 4 consists of a dish shaped top 8 having a circumferential wall 6 around the circumferential edge of the top 8. The entire assembly 10 consists of the cover 4 with the optical disc 2 attached to the inside of the cover 34 by an adhesive lining 30, and the assembly 10 is also held together by removeable rim 12 attached to the circumferential wall 6 of cover 4 and to the optical disc 2. The adhesive lining 30 secures the optical disc 2 to the cover 4. The rim 12 insures that the optical disc 2 will not become dislodged from the cover 4 before removal of the optical disc 2 is desired after the laser 16 creates the pits 42 in the writing surface 18 of the optical disc 2. Once pits 42 are created and the recording is complete, the optical disc 2, containing the desired pits 42, can be removed in a cleanroom to be electroformed. The entire assembly 10 forms a cavity 14 that effectively reproduces a cleanroom environment. Here, a cleanroom environment is one that is virtually free of all particulate on the order of 0.2 micron or larger. In the preferred embodiment, vent 20 permits the free flow of air molecules between the internal cavity 14 and the ambient air in order to equalize changes in the pressure. Although, vent 20 prevents the entire assembly 10 from being airtight, 0.2 micron filter 22 insures that particulate from the ambient air, on the order of 0.2 microns or larger, does not enter the spacial cavity 14 where the pits 42 are to be formed on the pregrooved optical disc 2. Thus, a cleanroom environment is preserved to the extent that particulate, on the order of 0.2 microns or larger, is kept out of spacial cavity 14.

Figure 2A:
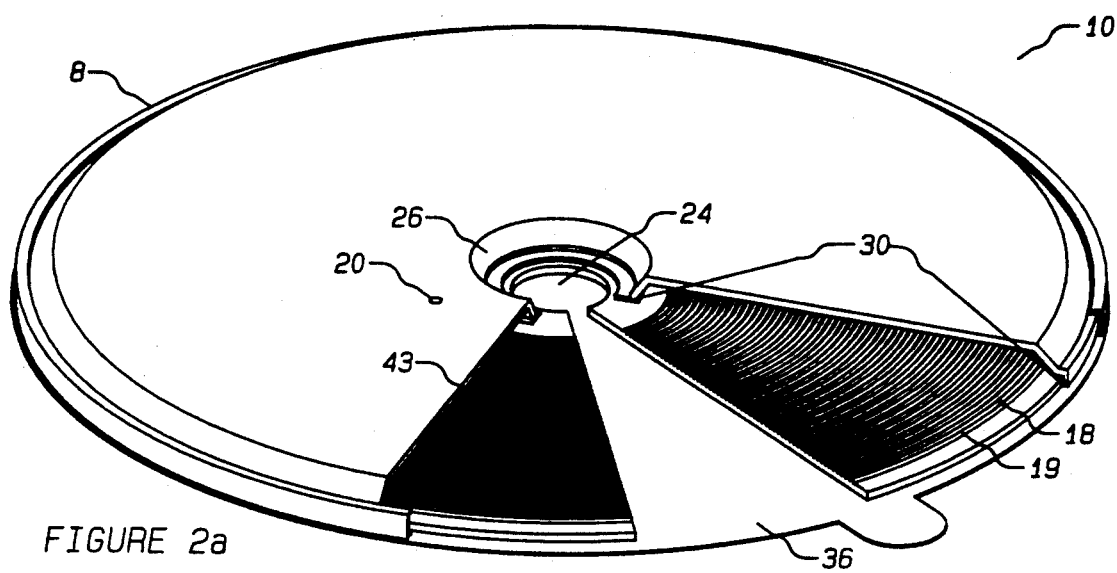
FIG. 2a is a top perspective view of the invention in the pre-recording position with a cut-away portion.
Figure 2B:
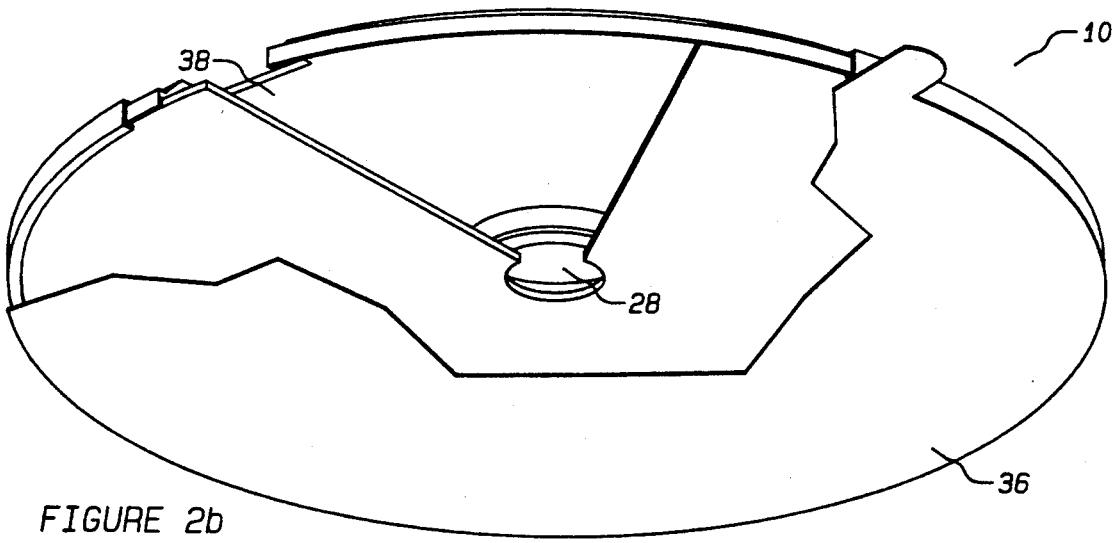
FIG. 2b is a bottom perspective view of the invention in the pre-recording position with a cut-away section.

As seen in FIGS. 2a and 2b, also part of the assembly 10 is foil layer 36 which attaches to the underside of the assembly. The foil layer 36 is used to prevent ambient contamination such as light, dust, smoke or fingerprints from contaminating the optically transparent bottom nonwriting surface 38 of optical disc 2 and to prevent ambient light transfer to the upper writing surface with its optically active lamina 19 during shelf storage of assembly 10. The foil layer 36 is peeled away from the assembly 10 prior to insertion of the assembly 10 into a recording machine.

Referring to FIGS. 2a, the cover 4 has a circular top 8 in which recessed area 26 defines a central aperture 24 within the dish shaped cover 4. The central aperture 24 is circular and concentric with the overall dish shape of the cover 4 and with the circular top 8. The enclosed pregrooved transparent optical disc 2 will also have a central aperture 28 whose center will also be concentric with that of the cover 4, central aperture 24, while the pregrooved optical disc 2 remains fixedly attached to cover 4 during the writing process in which the entire assembly 10 is placed such that the apertures (24, 28) engage the spindle in a recording machine. The inside surface 34, of the cover 4, has an adhesive layer 30 useful in securing the pregrooved optical disc 2 to the cover 4, and also, to trap particulate matter that may be inside the cover. The recessed area 26 of the cover 4 will meet the area of the optical disc 2 that defines the central aperture 28 of the optical disc 2 to isolate the internal cavity 14 from particulate contained within the ambient air. The adhesive layer 30, along the inside of the cover, will make contact with that area of the pregrooved optical disc 2 that defines central aperture 28. The nonwriting surface 38 of the optical disc 2 is exposed to the ambient air once the foil layer 36 is removed. However, there are no paths for ambient air to enter inside the spacial cavity 14 of the cover 4. The inside area 34 to the cover 4, along the circumferential wall 6, will also have an adhesive layer 30 that will meet the surface of the pregrooved transparent optical disc 2 thus insuring that no air will pass through the junction between the optical disc 2 and the circumferential wall 6, of the cover 4. The area on the writing surface 18, of the optical disc 2 that defines circular aperture 28, rests securely against the edge of the central aperture in the cover 24, thus, isolating the writing surface 18 of the optical disc 2 from the ambient conditions.

Referring now to FIGS. 2b, a bottom view of the entire assembly 10 shows the transparent optical disc that is attached to the cover 4 and to rim 12. In the preferred embodiment, the optical disc 2 is made from a transparent polycarbonate material that permits the passage of laser light to create pits 42 on the writing surface 18 of the pregrooved optical disc 2. The optically transparent nature of the optical disc 2 must be such that it will not defuse the light from the laser 16. It is necessary that the laser light is properly focused on the writing surface of the transparent pregrooved optical disc 2 to create pits by either ablating the optically active lamina 19 on the writing surface 18 of the optical disc 2, or by consuming the optical active lamina 19, thus, recording data. The optical disc 2 is separated from the entire assembly 10 in a cleanroom once the pits 42 are made. The pitted optical disc is then electroformed to have a stamper created and an optical disc master is thus created.

Figure 3:
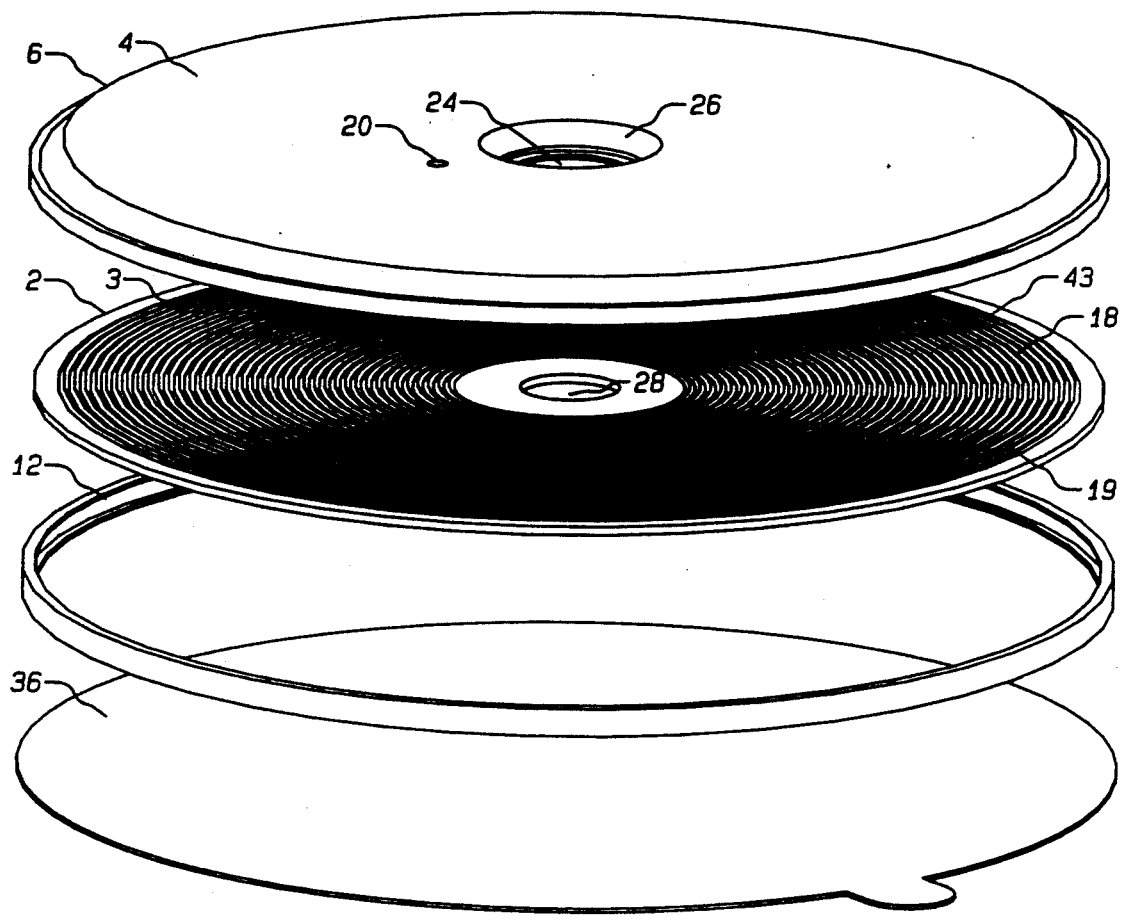
FIG. 3 is an exploded perspective view of the invention showing the major components.

As shown in FIGS 3, the entire assembly 10 consists of cover 4 with optical disc 2 that fits inside the cover 4. Rim 12 holds optical disc 2 fixedly in place until the desired time. Foil layer 36 insulates the underside of the assembly from ambient contamination, and is removed from the assembly prior to recording. The recessed area 26, of the cover 4, fits against the area of the writing surface 18 of the transparent optical disc 2 that defines the optical disc central aperture 28. The cover adhesive 30 helps to secure, in the areas of the cover 4 and optical disc 2, that define their respective central apertures (24, 28). The circumferential edge of the optical disc 2 rests against the circumferential wall, 6 of the cover 4, the cover adhesive prevents the free flow of air at this junction. The combination of cover adhesive 30 and rim 12 hold disc 2 securely against cover 4, thus preventing ambient contamination from entering enclosed internal cavity 14. The addition of vent 20 with sub-micron filter 22 insures that air molecules, which are normally on the order of one to two Angstroms, may freely circulate between the ambient atmosphere and enclosed internal cavity 14, while insuring that internal cavity 14 is free of particulate on the order of 0.2 microns or larger. The assembly 10 has a foil layer 36 that protects the nonwriting surface 38 of optical disc 2 from contamination during transport and storage. Foil layer 36 is removed for the recording of information onto optical disc 2.

While a particular embodiment of the invention as disclosed is claimed herein, modifications and variations of the invention are possible and contemplated to be within the area of the appended claims. Thus, it is not the intention that the specific limitations of the particular disclosure of the present invention made herein to limit the present invention, but that all possible variations encompassed by the appended claims shall determine the scope of the present invention.

What is claimed is:

1. An optical disc assembly for maintaining a portable cleanroom environment used in the recording phase of optical disc mastering comprising:
    a transparent optical disc having a writing surface with an optically active lamina formed thereon, said optically active lamina having ablative properties when radiated by laser light of a predetermined wavelength, and a nonwriting surface, said transparent optical disc permitting laser light of said predetermined wavelength, to pass through said transparent optical disc and focus on said optically active lamina to record data thereon;
    a cover for said transparent optical disc, said cover being constructed to be of a size and shape to enclose said optically active lamina and create a cavity immediately above said optically active lamina within said cover such that said writing surface containing said optically active lamina is isolated from ambient atmospheric contamination;
    means for removably securing said optical disc to said cover.

2. The invention of claim 1 further including sealing means removably attached to said cover near said nonwriting surface, said sealing means being operative to prevent ambient contamination from encountering and entering said optical disc assembly near said nonwriting surface of said optical disc.

3. The invention of claim 1 wherein said cover further includes
    a centering flange on said cover, said centering flange being of the size and shape to seal against said optical disc while providing for mounting of said optical disc assembly in a writing position in which laser light can enter said optical disc assembly to form pits on said optically active lamina.

4. The invention of claim 1 wherein said cover further comprises: a top area that is essentially dish shaped, said top area having a recessed area defining a circular aperture that is concentric with said dish shaped top area, and a circumferential edge having a circumferential wall formed, thereon, such that said optical disc can be inserted into said circumferential edge and removed, therefrom, when said means for removably securing are not in place.

5. The invention of claim 4 wherein said means for removably securing consists of a removable rim that can fixedly attach to said circumferential wall and hold said transparent optical disc within the space contained between said disc shape and said circumferential wall.

6. The invention of claim 1 wherein said transparent optical disc has a tracking groove to enable a laser to follow said groove when ablating said optically active lamina to form pits within said transparent optical disc.

7. The invention of claim 6 wherein pits formed on said optical disc have a geometry that is determined by the geometry of said grooves.

8. The invention as in claim 3 wherein said cover has an adhesive layer on portions of said cover that make physical contact with said optical disc, said adhesive layer forming a seal where contact is made between said cover and said optical disc thereby preventing air flow between said isolated area enclosing said optically active lamina and the ambient atmosphere.

9. The invention of claim 1 wherein said cover includes a vent to allow for pressure equalization air enclosed by said cover and the ambient air, said vent having a filter to prevent particulate from entering said cover while still allowing the flow of air through said vent.

10. A method of creating a cleanroom environment for the manufacture of optical disc masters comprising the steps of:
manufacturing an optical disc having a transparent substrate with an optically active lamina deposited on a surface, thereon;
enclosing said optical disc in a container that allows laser light to focus on said optically active lamina forming pits in said optically active lamina while providing an isolated area for said surface on which said optically active lamina is deposited, said isolated area maintaining a cleanroom environment;
writing to said optically active lamina by focusing laser light through said transparent substrate onto said optically active lamina, thereby, forming pits within said optically active lamina; and
removing said optical disc from said container, in a cleanroom, after pits have been formed on said optical disc so that an optical disc master can be made, therefrom.

11. The method of claim 10 wherein the step of enclosing said optical disc in said container further comprises venting said container to equalize pressure between said isolated area having said cleanroom environment and the ambient atmosphere, said venting step being accomplished by placing an aperture within said container and attaching a filter to said aperture to control particulate size allowable within the cleanroom enclosed between said container and said optical disc.

12. The method of claim 10 wherein the step of writing to said optically active lamina further includes tracking a data modulated laser along a groove within said surface on said optical disc, said laser being programmed to form a series of pits within said optically active lamina on said disc, said pits having a size and shape that can be read by a compact disc player.

13. The invention of claim 12 wherein said optical disc, having said groove within said surface, is an optically transparent disc that enables laser light to pass through said optically transparent disc to form pits within said groove on said optically active lamina.

14. A method of making optical disc masters comprising the steps of:
manufacturing a transparent optical disc having an optically active lamina deposited on at least one surface;
sealing said optical disc within a cover while in a cleanroom environment to control particulate size within said cover;
creating within said cover means to allow a laser to focus on said optically active lamina on said transparent optical disc;
forming a series of pits in said optically active lamina by focusing a laser upon said optically active lamina;
removing said optical disc with said pits while in a cleanroom; and
electroforming said surface of said optical disc containing said pits to form a disc master.

15. The method of claim 14 further including the step of venting said clean container to equalize the air pressure inside said container with that of the ambient atmosphere and filtering the air that is vented through said clean container.

16. The method of claim 14 wherein said transparent optical disc has a pregrooved surface to enable laser tracking when pits are being formed in said optically active lamina.

17. The method of claim 16 wherein pits are formed within the grooves of said pregrooved surfaces of a size and shape determined by the dimensions of the grooves and a thickness sufficient to create light and dark reflectivity patterns for playback of the recorded disc on a common disc player.

* * * * *